(12) United States Patent  
Kabakov

(10) Patent No.: US 6,224,441 B1
(45) Date of Patent: May 1, 2001

(54) PROPULSION SYSTEM AND METHOD

(76) Inventor: Vladimir Michael Kabakov, 4600 S. Four Mile Run Dr., Apt. 1201, Arlington, VA (US) 22204

( * ) Notice: Subject to any disclaimer, the term of this patent is extended or adjusted under 35 U.S.C. 154(b) by 0 days.

(21) Appl. No.: 09/620,532

(22) Filed: Jul. 20, 2000

Related U.S. Application Data

(63) Continuation-in-part of application No. 09/479,891, filed on Jan. 10, 2000, now abandoned.

(51) Int. Cl.[7] ............................................. B63H 1/08
(52) U.S. Cl. ........................... 440/93; 244/9; 244/19; 244/70; 416/110
(58) Field of Search .................... 440/90, 92, 93; 244/9, 19, 20, 70; 416/110

(56) References Cited

U.S. PATENT DOCUMENTS

| | | | |
|---|---|---|---|
| 1,284,282 | * 11/1918 | Fitzpatrick | 440/90 |
| 1,450,454 | * 4/1923 | Roney | 244/70 |
| 1,667,140 | * 4/1928 | Clark | 416/110 |
| 1,923,249 | * 8/1933 | Abram | 244/70 |
| 3,270,820 | * 9/1966 | Frazier | 416/110 |
| 3,801,047 | * 4/1974 | Dell'Aquila | 244/19 |

FOREIGN PATENT DOCUMENTS

217223 * 9/1924 (GB) ...................................... 440/93

* cited by examiner

Primary Examiner—Sherman Basinger

(57) ABSTRACT

A method and system for developing a propulsive force which can be utilized for driving different types of water, air or land vehicles. The propulsive force is developed by rotating a propeller shaft with four generally flat propeller blades mounted on two perpendicular intercrossed axles, which are fixed to the propeller shaft in a plane perpendicular to its axis. The surface of each blade is lying in a plane perpendicular to the axle on which it is mounted and the blades are rotated in these planes around these intercrossed axles with the same speed in different directions, so that the adjacent propeller blades are rotated clockwise and counterclockwise not interfering with each other. During such double rotation, the radial extensions of the propeller blades relative to the propeller shaft are changed as a function of the angle of rotation, so that four propeller blades are working in a paddling manner with both sides of the propeller blades being used consecutively as working surfaces, so that virtually uniform propulsive force is exerted during all 360 degrees of rotation of the propeller shaft. In a preferred embodiment of the propulsion apparatus the propeller blades are constrained by four engaged angle miter gears and by planetary gear engagements to rotate synchronously around the axis of the propeller shaft and around the intercrossed axles. The propulsion system can include two or more parallel propeller shafts rotated in opposite directions.

10 Claims, 6 Drawing Sheets

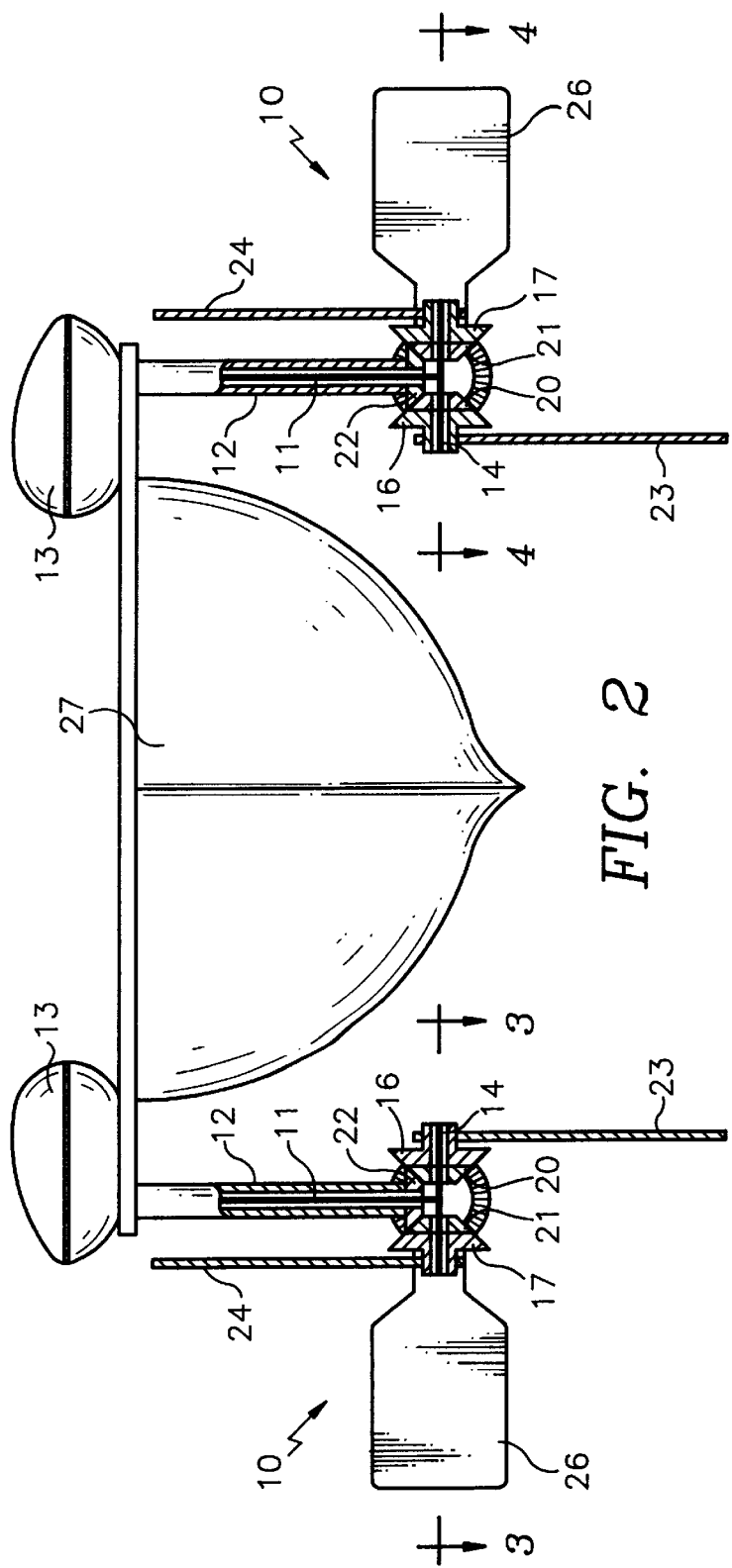

PROPULSION SYSTEM AND METHOD

CROSS-REFERENCE TO RELATED APPLICATIONS

The present application is a continuation-in-part of application Ser. No. 09/479,891, filed Jan. 10, 2000 which is now abandoned.

BACKGROUND OF THE INVENTION

1. Field of the invention

This invention relates generally to improvements in propeller systems, and more particularly it pertains to a new method and system for developing a propulsive force in a gaseous or liquid fluid and can be used for propulsion or sustaining aircraft, marine vessels, and different types of land vehicles, such for example, as snowmobiles, etc. Numerous other applications can be derived from the use of this invention, for example in designing apparatus for moving gaseous or liquid fluids such as fans, pumps. etc.

2. Description of the Prior Art

Historically, various propeller or peddler systems have been developed for propulsion of different types of vehicles by movement of water or air in opposite direction to the movement of the vehicle. Numerous patents and researches have been devoted to the problem of optimizing cyclic variations of the orientation of the individual blades in a propulsion system wherein the blades are pivoted to their respective optimum angle of incidence.

Some of such systems utilize rotation of propeller blades or paddles not only around the axis of the propeller shaft but also around a complementary axes of rotation for more effective exerting propulsive force. The basic concepts presented in these systems is that the usable propulsive force is developed as a result of rotating the propeller blades around two axes of rotation with variable orientation of the rotated propeller blades relative to the propeller shaft.

Propulsion apparatus are known wherein the propeller blades are oriented and rotated in the planes parallel to the driving shaft (U.S. Pat. No. 3,270,820 to Frazier, British patent 217,223 to Pensovecchio). However, such systems with only two blades mounted in a plane perpendicular to the propeller shaft have low efficiency and irregular power consumption. Different combinations of such propulsion apparatus are cumbersome and the mechanisms employed to effect their operations are far too complicated to render them practical, For these reasons, a limited success has been obtained by such type of apparatus.

The invention seeks to overcome the deficiencies of known propeller systems and to benefit from the advantages that may be expected from the new method and system.

The object of the invention is to provide a propulsion system with improved energy efficiency and maximum usable propulsive force.

BRIEF SUMMARY OF THE INVENTION

The invention is based on my discovery that a propulsive force in a liquid or gaseous fluid can be developed by rotating a propeller shaft with four generally flat propeller blades rotatably mounted on two intercrossed axles which are perpendicular to each other and are fixed to the propeller shaft in a plane perpendicular to its axis. The propeller blades are oriented so that the surface of each propeller blade is lying in a plane perpendicular to the axle on which it is mounted. The blades are connected with each other in such a way that when two parallel propeller blades on one of the intercrossed axles are oriented along the axis of the propeller shaft in opposite direction, the other two parallel propeller blades on the other of the intercrossed axles are oriented in the direction perpendicular to the propeller shaft. It was discovered that four such generally flat propeller blades can be rotated around perpendicular intercrossed axles with the same speed without interfering with each other when each two adjacent blades mounted in perpendicular planes are rotated in different directions (clockwise and counterclockwise). During such a double rotation of four propeller blades with the same speed around the axis of the propeller shaft and simultaneously around the intercrossed axles, the radial extensions of the propeller blades relative to the propeller shaft are changed as a function of the angle of rotation, so that four propeller blades work in a paddling manner during all 360 degrees of rotation of the propeller shaft with both sides of the propeller blades being used consecutively as working surfaces. As a result, a uniform and effective propulsive force is exerted.

In a preferred embodiment of the invention four angle gears of mitre type are rotatably mounted on the intercrossed axles and are engaged with each other. Each of these gears is coupled with the propeller blade mounted on the same axle so that the propeller blades are constrained to rotate synchronously in different directions. The propeller blades are also constrained by planetary gear engagements to rotate around the intercrossed axes simultaneously with rotating around the axis of the propeller shaft. At least one sun angle gear in each of these planetary gear engagements is fixed coaxially to the propeller shaft and at least one planetary angle gear is mounted on at least one of the intercrossed axles.

The propulsion system can include two or more propeller shafts rotated synchronously in opposite directions for developing a uniform propulsive force in one direction.

BRIEF DESCRIPTION OF THE DRAWINGS

These objects and features of the present invention will become apparent from the following description taken in conjunction with the preferred embodiments thereof with reference to the accompanying drawings, in which:

FIG. 2 illustrates two propulsion apparatus of the preferred embodiment mounted on a boat.

FIG. 3 is a cros-section along the lines 3—3 of FIG. 2.

FIG. 4 is a cross-section along the lines 4—4 of FIG. 2.

DETAILED DESCRIPTION OF THE INVENTION

Figure 1:
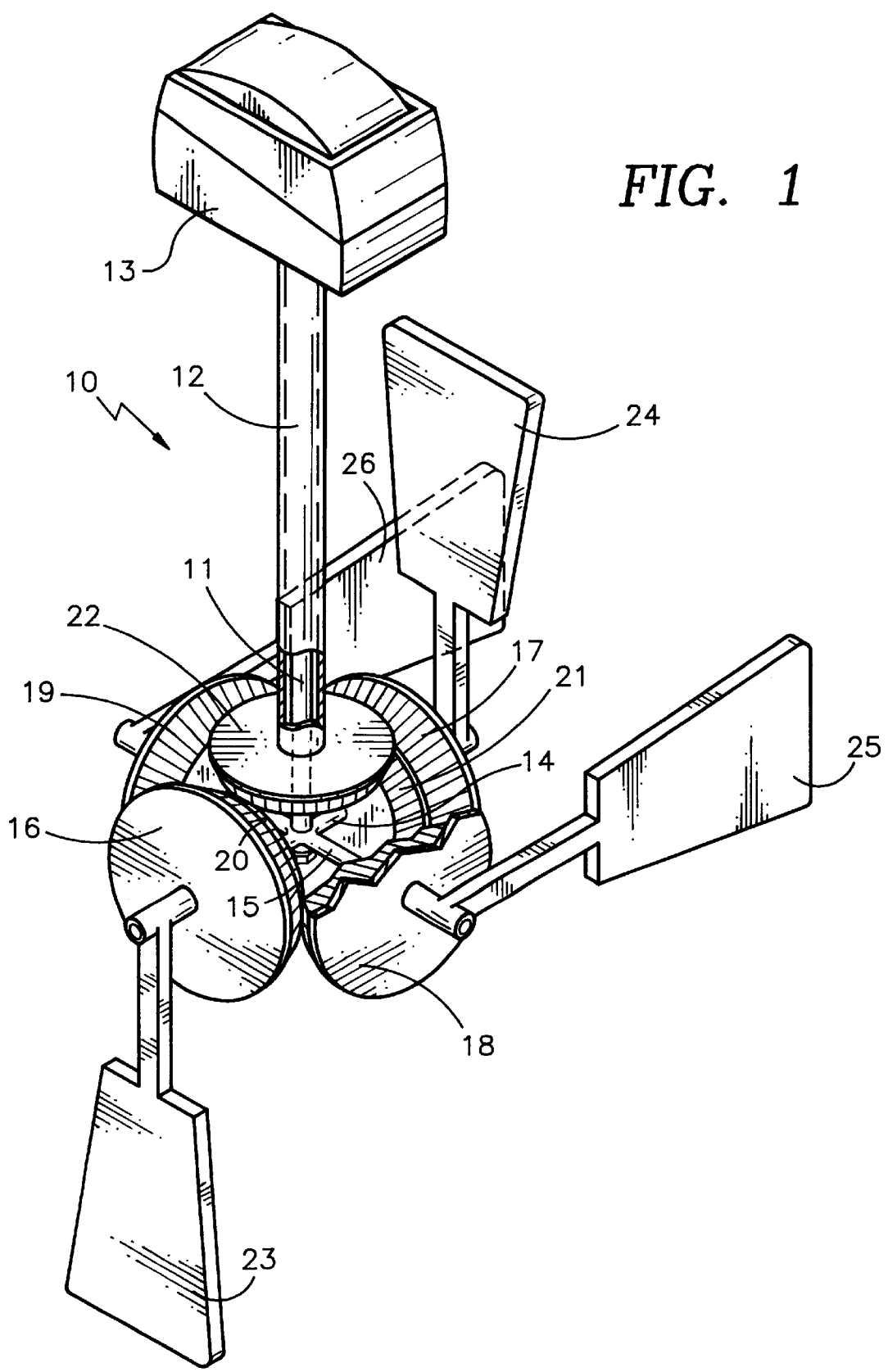
FIG. 1 is a schematic perspective view of the preferred embodiment of the propulsion apparatus.

A preferred embodiment of the present invention is schematically illustrated in FIG. 1. A boat or other marine vessel and a vertical takeoff and landing aircraft comprising such propulsion system are shown, by way of examples, in FIGS. 2–8 on which similar details identified as in FIG. 1.

The propulsion apparatus, generally indicated as 10, includes a propeller shaft 11 rotatably mounted in a support means 12 and driven by an engine 13 (or any other kind of drive). Two intercrossed axles 14 and 15 are mounted on the propeller shaft 11 in a plane perpendicular to its axis and perpendicular to each other. Four angle mitre gears 16, 17, 18, 19 are rotatably mounted on these intercrossed axles 14 and 15 so that they and are engaged with each other. In addition, two planet angle mitre gears 20, 21 are rotatably mounted on one of an intercrossed axles 14 so that they are engaged with the sun angle mitre gear 22 which is mounted on the support means 12 coaxially to the propeller shaft 11. The gears 20 and 21 are coupled with the gears 16 and 17, respectively. Generally flat propeller blades 23, 24, 25 and 26 are mounted on the hubs of the angle mitre gears 16, 17, 18, 19, respectively, so that the surface of each of these blades is lying in a plane perpendicular to the axle on which it is mounted. They are oriented in such a way that when one pair of the propeller blades 23, 24, mounted on one of the intercrossed axles 14, extends parallel to the axis of the propeller shaft 11 in opposite directions, the other pair of the propeller blades 25, 26, mounted on the other of intercrossed axles 15, extends in the direction perpendicular to the axis of the propeller shaft 11.

In operation, when the propeller shaft 11 is rotated by the engine 13 together with the propeller blades 23, 24, 25, 26, they are constrained by the engagements of angle mitre gears 16, 17, 18, 19 and by the planetary angle mitre gear engagements 22, 20 and 22, 21 to rotate simultaneously around the intercrossed axles 14 and 15. Because the angle mitre gears 20, 21 and 22 have the same size, the propeller blades 23, 24, 25, 26 are rotated around the intercrossed axles 14, 15 with the speed of rotation of the propeller shaft 11. The adjacent propeller blades are rotated in different directions (clockwise and counterclockwise), so as not to interfere with each other. The angle position of the propeller blades 23, 24, 25, 26 on the intercrossed axles 14, 15 and their radial extensions relative to the propeller shaft 11 are changed as a function of the angle of rotation.

Referring now to FIGS. 2, 3 and 4, a boat 27 is shown with a propulsion system including two such propulsion apparatus 10 mounted on both sides of the hull. Two vertical propeller shafts 11 are driven by the engines 13 in opposite directions, identified by arrows A and B, so that the propeller blades operate in paddle fashion. At a moment when one pair of the propeller blades 25, 26 comes to a paddling position perpendicular to the longitudinal axis of the boat 27 having the biggest swept surface, the other two propeller blades 23, 24 extend in opposite directions parallel to the propeller shafts 11. After each 90 degrees of rotation of the propeller shafts 11, another pair of the propeller blades 23, 24 comes to a position perpendicular to the longitudinal axis of the boat and the blades 25, 26 extend in opposite directions parallel to the propeller shaft 11 (not shown). Between these two extreme positions, all four propeller blades 23, 24, 25, 26 are working in a paddling manner with their radial extensions being changed as a function of the angle of rotation of the propeller shaft 11. As a result, a virtually uniform and effective propulsive force is exerted during all 360 degrees of rotation of the propeller shaft with both sides of the propeller blades being used consecutively as working surfaces.

Figure 5:
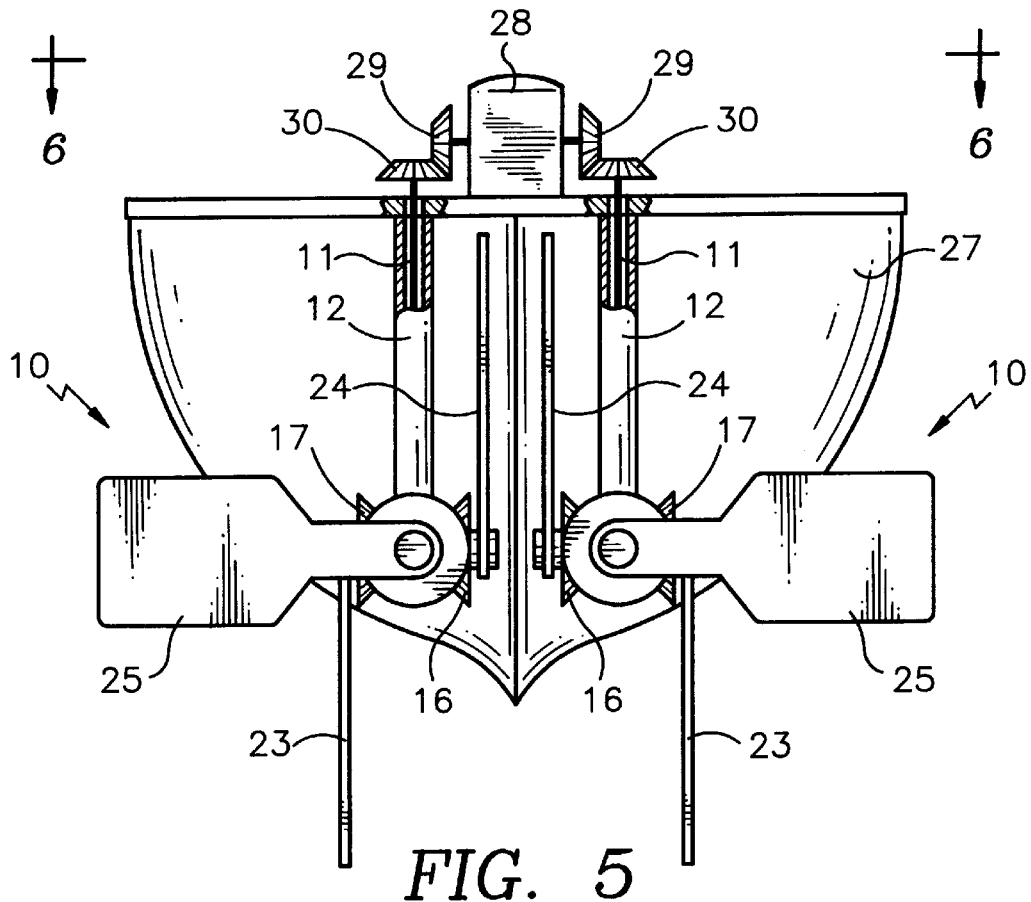
FIG. 5 illustrates another example of mounting the propulsion apparatus of the preferred embodiment on the stern of a boat.
Figure 6:
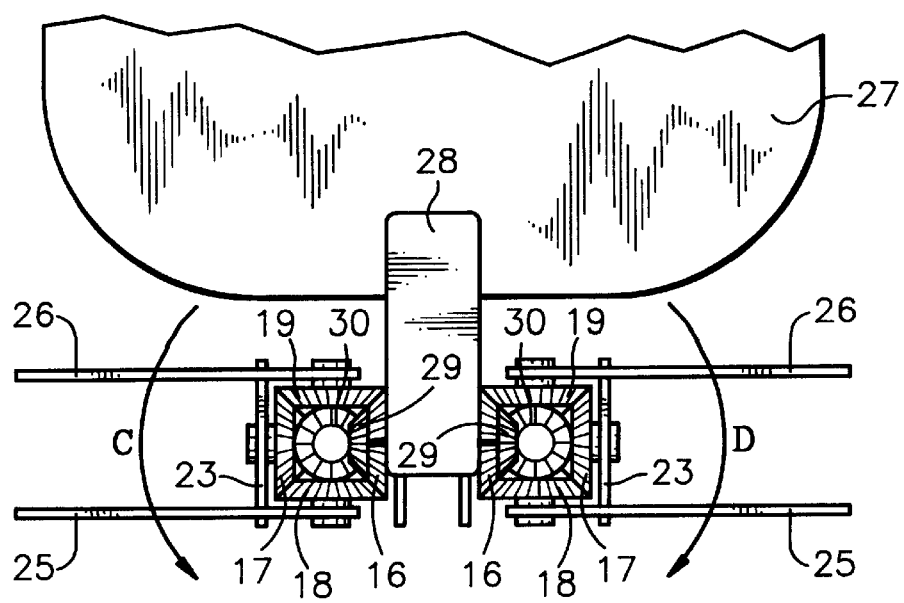
FIG. 6 is a fragmentary view along the arrow 6 in FIG. 5.

FIGS. 5 and 6 illustrate another example of the propulsion system with two propulsion apparatus 10 mounted on the stern of a boat 27. Two vertical propeller shafts 11 are positioned in close proximity to each other and are rotated synchronously by a single engine 28 through angle gear engagements 29, 30 in opposite directions, identified by arrows C and D. The propeller blades, mounted on both shafts, are working in paddling fashion without interfering with each other.

Figure 7:
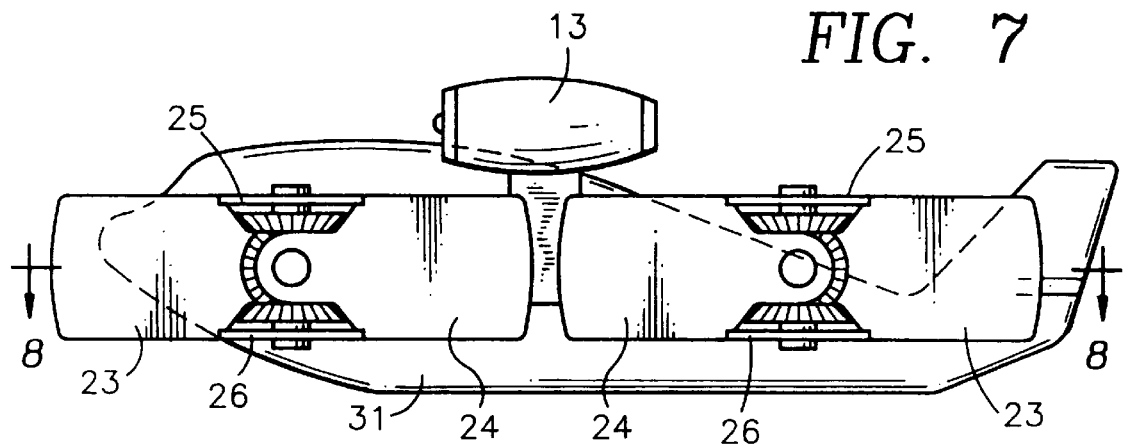
FIG. 7 is a side elevation view of a vertical takeoff and landing aircraft with a propulsion system of the preferred embodiment.
Figure 8:
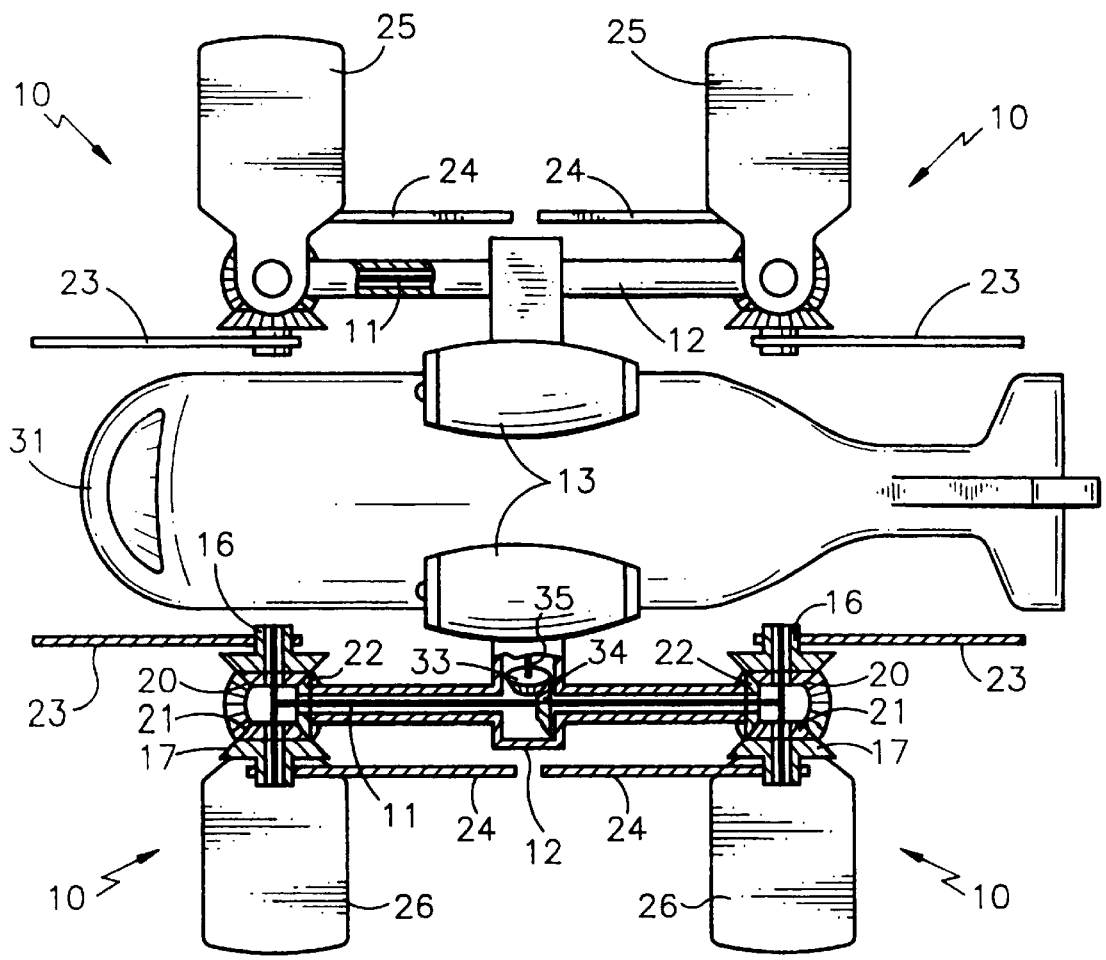
FIG. 8 is a schematic fragmentary cross-sectioned top plan view along the lines 8—8 in FIG. 7.

Referring now to FIGS. 7 and 8, a vertical takeoff and landing aircraft is schematically shown with a propulsion system comprising four such propulsive apparatus 10. Two generally horizontal shafts 11 are rotatably mounted in hollow support means 12 which are mounted on the fuselage 31. Four propeller blades 23, 24, 25 and 26 are rotatably mounted on the intercrossed axles on both ends of each propeller shaft 11. Advantageously, the propeller shafts 11 can be mounted in close proximity to the fuselage 31 without its interfering with the rotating propeller blades. When the propeller shafts 11 are driven by the engines 13 through a gear engagement 33, 34 synchronously in opposite directions, eight propeller blades on each side of the fuselage 31 are working as "flapping wings." After each 90 degrees of rotation of the propeller shafts 37, one pair of the propeller blades (25, 26 or 23, 24) at each end of the propeller shafts is oriented horizontally with the biggest swept surface and a virtually uniform propulsive force is exerted by the propeller blades in vertical direction for lifting or sustaining the aircraft during all 360 degrees of rotations of the propeller shafts. The propulsive system also offers the possibility of controlling the direction of the developed propulsive force by changing the positions of the support means 12 together with the propeller shafts 11 by turning them around the axes 35.

Figure 9:
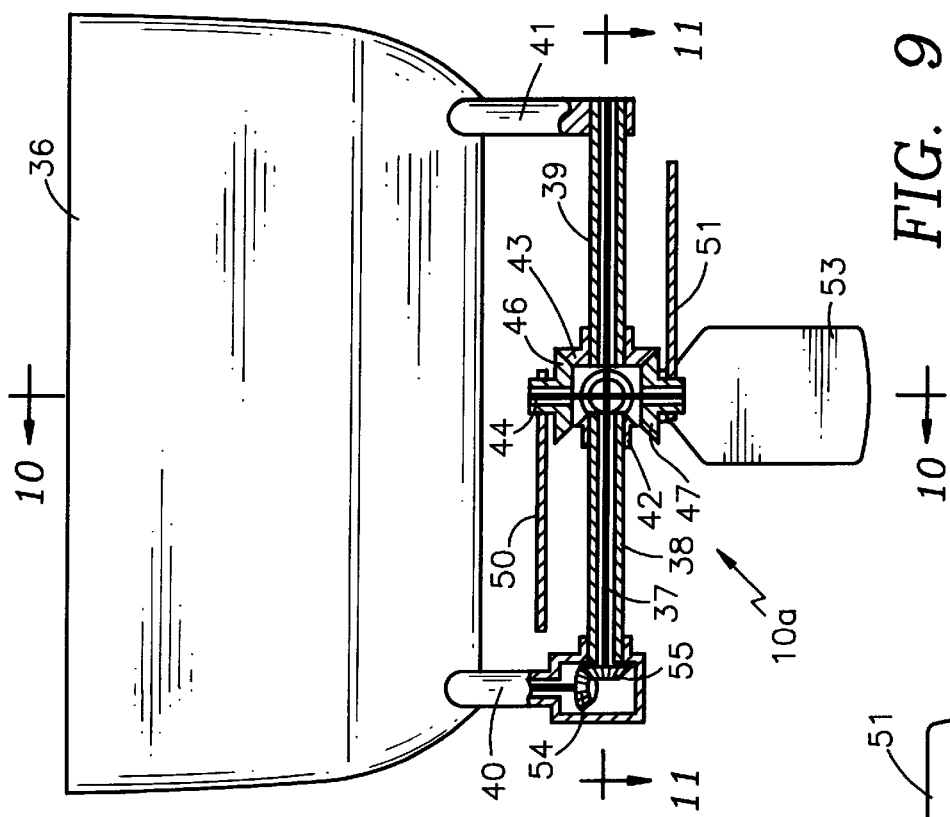
FIG. 9 illustrates a second embodiment of a propulsion apparatus mounted on a marine vessel.
Figure 11:
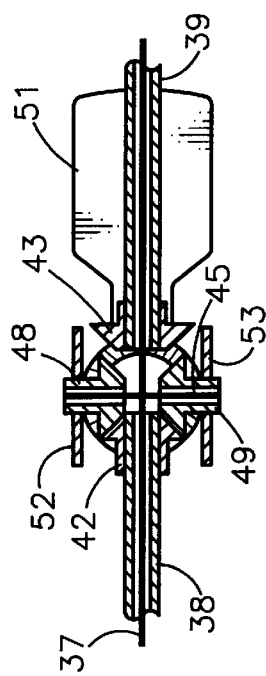
FIG. 11 is a fragmentary cross-sectional view along the lines 11—11 in FIG. 9.
Figure 10:
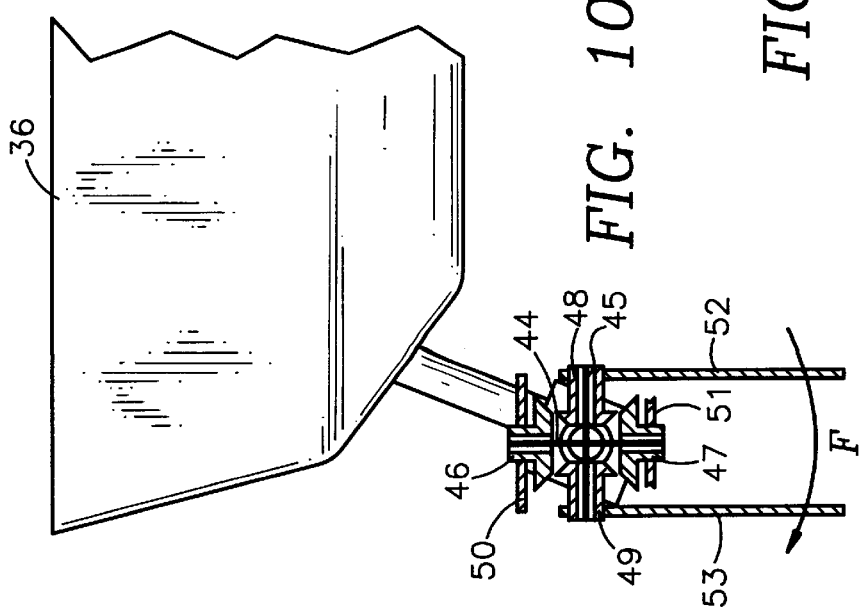
FIG. 10 is a fragmentary cross-sectional view along the lines 10—10 in FIG. 9.

Referring now to FIGS. 9, 10 and 11, an alternative embodiment of the propulsion apparatus 10a is illustrated which is mounted on a marine vessel 36. A horizontal propeller shaft 37 is rotatably mounted in two hollow support means 38 and 39 which are attached to the vessel 36 on brackets 40, 41, respectively. Sun angle mitre gears 42 and 43 are mounted on the support means 38 and 39, respectively, coaxially with the propeller shaft 37. The intercrossed axles 44 and 45 are mounted in the middle of the propeller shaft 37. Two planet angle mitre gears 46 and 47 are rotatably mounted on the axle 44, so that they are engaged with the sun mitre gear 43. Another two planet mitre gears 48 and 49 are rotatably mounted on the axle 45, so that they are engaged with the sun mitre gear 42. Generally flat propeller blades 50, 51, 52 and 53 are mounted on the hubs of the planet angle mitre gears 46, 47, 48 and 49, respectively.

In operation, the propeller shaft 37 is rotated together with the propeller blades 50, 51, 52, 53 by any kind of drive (not shown) through a gear engagement 54, 55 in the direction identified by arrow F. Simultaneously, the propeller blades are rotated with the same speed around the intercrossed axles 44 and 45. As a result of such double rotation, all four propeller blades are working in a paddling fashion in a vertical plane. After each 90 degrees of rotation of the propeller shaft 37, one pair of the propeller blades is oriented vertically (as the blades 52, 53 in FIGS. 9–11) with the biggest swept surface and maximum propulsion force exerted, while the other two propeller blades are oriented at that moment horizontally parallel to the propeller shaft 37 in opposite directions (as the blades 50, 51 in FIGS. 9–11).

Figure 12:
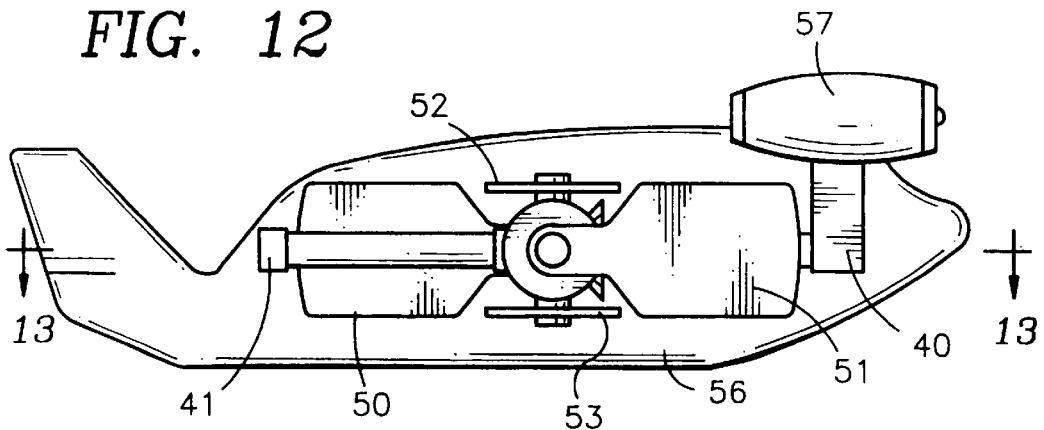
FIG. 12 is a side elevational view of a vertical takeoff and landing aircraft with a propulsion system of the second embodiment.
Figure 13:
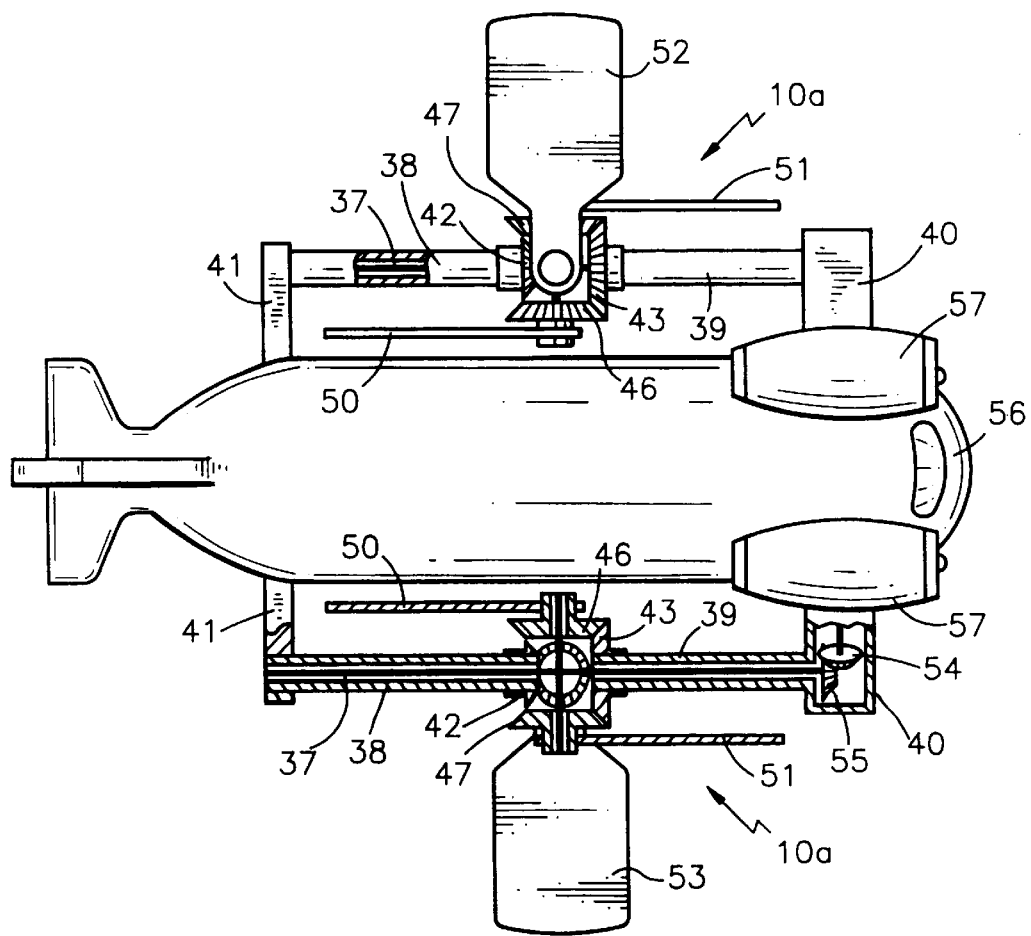
FIG. 13 is a schematic fragmentary cross-sectioned top plan view taken along the lines 13—13 in FIG. 12.

Referring now to FIGS. 12 and 13, a vertical takeoff and landing aircraft is schematically shown with a propulsion system comprising two propulsive apparatus of the second embodiment 10a. Similar details are identified as in FIGS. 9–11.

Two horizontal propeller shafts 37 with propeller blades 50, 51, 52 and 53 are mounted in the hollow support means 38 and 39 which are attached to the fuselage 56 of an aircraft on brackets 40, 41, respectively. When the propeller shafts 37 are driven by engines 57 through gear engagements 54, 55 in opposite directions, four propeller blades on each side of the fuselage 56 are working as "flapping wings" and, as a result, a vertical propulsive force is exerted for lifting or sustaining the aircraft.

While this invention has been described with reference to the structures disclosed herein, the preferred embodiments of the present invention illustrated in FIGS. 1–13 are not confined to the details as set forth and are not intended to be exhaustive or to limit the invention to the precise form disclosed. They are merely providing illustrations of some of the presently preferred embodiments and are chosen and described to illustrate the principle, applications, and practical use of the invention to thereby better enable others skilled in the art to utilize the invention. This application is intended to cover any modifications of the invention, which may be variously practiced within the scope of the following claims or their legal equivalents, rather than by examples given.

What is claimed is:

1. A method of developing a propulsive force in a liquid or a gaseous fluid for driving a vehicle, including:
   mounting at least one propeller shaft on said vehicle;
   mounting at least one pair of perpendicular intercrossed axles on said propeller shaft in a plane perpendicular to the axis of said propeller shaft;
   rotatably mounting four propeller blades on each said pair of said intercrossed axles with the surface of each of said propeller blades lying in a plane perpendicular to the intercrossed axle on which it is mounted, said four propeller blades being oriented so that when two of them, mounted on one of said intercrossed axles, extend in opposite directions parallel to the axis of said propeller shaft, the other two said propeller blades, mounted on another said intercrossed axle, extend in the same direction perpendicular to said propeller shaft;
   rotating said propeller shaft together with said propeller blades around the axis of said propeller shaft;
   rotating said propeller blades around said intercrossed axles in different directions so that in each pair of adjacent said propeller blades one said propeller blade is rotated clockwise and another said propeller blade is rotated counterclockwise, so that said propeller blades are not interfering with each other; wherein:
   the speed of rotation of said propeller blades around said intercrossed axles is equal to the speed of rotating of said propeller shaft.

2. The method of developing a propulsive force of claim 1, wherein at least two said propeller shafts are mounted on said vehicle generally parallel to each other and are rotated in opposite directions.

3. A propulsion apparatus comprising:
   at least one propeller shaft;
   means for rotating said propeller shaft;
   at least two perpendicular intercrossed axles fixed to said propeller shaft in a plane perpendicular to the axis of said propeller shaft;
   four propeller blades rotatably mounted on each pair of said intercrossed axles with the surface of each of said propeller blade lying in a plane perpendicular to the axle on which it is mounted, said propeller blades being connected with each other so that when two of said propeller blades, mounted on one of said intercrossed axle, are parallel to each other and extend parallel to the axis of said propeller shaft in opposite directions, the other two of said propeller blades, mounted on another said intercrossed axle, are also parallel to each other and extend in the same direction perpendicular to said propeller shaft;
   means for rotating said propeller blades around said intercrossed axles with the speed equal to the speed of rotation of said propeller shaft.

4. The propulsion apparatus of claim 3, wherein four angle mitre gears are rotatably mounted on each pair of said intercrossed axles, said angle mitre gears are engaged with each other and are coupled with said propeller blades.

5. The propulsion apparatus of claim 3, wherein at least one planetary angle mitre gear engagement connects said propeller shaft with said propeller blades; wherein:
   at least one sun angle mitre gear of said planetary angle mitre gear engagement is fixed coaxially with said propeller shaft;
   at least one planet angle mitre gear of said planetary angle mitre gear engagement is rotatably mounted on at least one of said intercrossed axles.

6. The propulsion apparatus of claim 3, wherein:
   at least two of said propeller shafts are mounted parallel to each other with ability of rotation in opposite directions.

7. The propulsion apparatus of claim 6, wherein there is a means for synchronization of rotation of said propeller shafts in opposite directions.

8. A vehicle with at least one propulsion apparatus of claim 3.

9. The vehicle of claim 8, wherein said vehicle is a marine vessel.

10. The vehicle of claim 8, wherein said vehicle is an aircraft.

* * * * *